United States Patent
Machado et al.

(10) Patent No.: US 7,451,947 B2
(45) Date of Patent: Nov. 18, 2008

(54) ENGINE MOUNTING STRUCTURE UNDER AN AIRCRAFT WING

(75) Inventors: Stephane Machado, Villeneuve-Tolosane (FR); Jerome Cassagne, Toulouse (FR); Anthony Del Blanco, Toulouse (FR); Yvon Martin, Bonrepos Riquet (FR); Arnaud Chambreuil, Labastide Saint Sernin (FR)

(73) Assignee: Airbus France, Toulouse (FR)

( * ) Notice: Subject to any disclaimer, the term of this patent is extended or adjusted under 35 U.S.C. 154(b) by 352 days.

(21) Appl. No.: 10/986,791

(22) Filed: Nov. 15, 2004

(65) Prior Publication Data
US 2005/0178888 A1  Aug. 18, 2005

(30) Foreign Application Priority Data
Nov. 25, 2003  (FR) .................................. 03 50907

(51) Int. Cl.
*B64D 27/00* (2006.01)
*F16M 13/00* (2006.01)
*F02C 7/20* (2006.01)

(52) U.S. Cl. ............................ 244/54; 248/554; 60/797
(58) Field of Classification Search ......... 244/53 R–56; 248/554–557; 60/796, 797
See application file for complete search history.

(56) References Cited

U.S. PATENT DOCUMENTS

| | | | |
|---|---|---|---|
| 3,042,349 A | | 7/1962 | Pirtle et al. |
| 3,831,888 A | | 8/1974 | Baker et al. |
| 4,560,122 A | * | 12/1985 | Parkinson et al. ............. 244/54 |
| 5,238,206 A | * | 8/1993 | Pachomoff ................... 244/54 |
| 5,467,941 A | * | 11/1995 | Chee ........................... 244/54 |
| 5,524,847 A | * | 6/1996 | Brodell et al. ................ 244/54 |
| 5,806,792 A | * | 9/1998 | Brossier et al. .............. 244/54 |
| 6,095,456 A | * | 8/2000 | Powell ........................ 244/54 |
| 6,341,746 B1 | * | 1/2002 | Pascal et al. ................. 244/54 |
| 6,682,015 B2 | * | 1/2004 | Levert et al. ................. 244/54 |
| 6,869,046 B2 | * | 3/2005 | McEvoy ...................... 244/54 |
| 7,083,143 B2 | * | 8/2006 | Whitmer et al. .............. 244/54 |

(Continued)

FOREIGN PATENT DOCUMENTS

FR  2 738 034  8/1997

(Continued)

OTHER PUBLICATIONS http://mw1.merriam-webster.com/dictionary/vertex.*

*Primary Examiner*—Michael R Mansen
*Assistant Examiner*—Joshua J Michener
(74) *Attorney, Agent, or Firm*—Oblon, Spivak, McClelland, Maier & Neustadt, P.C.

(57) ABSTRACT

This invention relates to a mounting structure (1) for mounting an engine (2) under an aircraft wing (4), the structure comprising a rigid structure (8) and means (10) of fastening this rigid structure under the wing, the mounting means comprising a forward fastener (14), an intermediate fastener (15) and an aft fastener (16). According to the invention, the forward fastener has at least one triangular shackle on each side of a vertical plane passing through a longitudinal axis (5) of the engine (2), placed in a vertical plane oriented along a longitudinal direction (X) of the aircraft. Furthermore, the intermediate fastener comprises a connecting rod capable of transferring forces applied in a direction (Y) transverse to the aircraft, and the aft fastener comprises at least one shackle oriented along a vertical direction (Z) of the aircraft.

26 Claims, 4 Drawing Sheets

U.S. PATENT DOCUMENTS 7,121,504 B2 * 10/2006 Machado et al. .............. 244/54
2004/0129832 A1    7/2004 Marche

FOREIGN PATENT DOCUMENTS

| FR | 2 836 672 | 9/2003 |
| GB | 2049817 A | * 12/1980 |
| GB | 2215290 A | * 9/1989 |

* cited by examiner

ENGINE MOUNTING STRUCTURE UNDER AN AIRCRAFT WING

This invention relates to a structure for mounting or suspending an engine under an aircraft wing, this device comprising a rigid structure and means of mounting this rigid structure under the wing.

This type of structure may be used on any type of aircraft comprising engines suspended from its wing, such as turbojets or turboprops.

STATE OF PRIOR ART

On existing aircraft, engines are suspended under the wing by complex Engine Mounting Structures (EMS).

For turbojets, the most frequently used mounting structures have a rigid box type structure, also called a "pylon", in other words formed by the assembly of lower and upper stringers connected together by a plurality of transverse ribs. Furthermore, turboprop mounting structures are usually composed of an aft underwing box, extended by a lattice structure, in the forward longitudinal direction of the turboprop.

In a known manner, these structures are designed particularly to transmit static and dynamic forces generated by engines, such as weight, thrust or different dynamic forces, to the wing.

In this respect, in known mounting structures according to prior art, forces are conventionally transmitted between the structure and the wing by a forward fastener, an aft fastener and an intermediate fastener designed particularly to resist thrust forces.

To achieve this, the forward fastener comprises two groups of shackles, each placed vertically on each side of the rigid structure. Each group of shackles connects a fitting with a double head fixed to the upper stringers of the rigid structure of the device, to a double headed fitting fixed to a forward stringer of the wing. Connections between groups of shackles and the fittings are made by axes oriented along a direction transverse to the aircraft, in other words along a direction orthogonal to the vertical and also to the longitudinal axis of this aircraft.

The aft fastener comprises two pairs of triangular shackles placed in vertical planes oriented along the transverse direction of the aircraft. These two pairs of triangular shackles connect a double fitting fixed to the upper aft stringer of the rigid structure, to a fitting fixed to an intermediate stringer of the wing. Connections between the two pairs of shackles and the fittings are then made through axes oriented along the longitudinal direction of the aircraft.

The intermediate fastener that will resist the thrust forces, also called the "spigot" fastener, is usually materialised by a ball joint with a vertical axis fixed in the aft upper stringer of the rigid structure, between the forward fastener and the aft fastener. This spigot fastener is a shear pin fixed under the aircraft wing, so that it projects vertically into the ball joint mentioned above.

In this conventional statically determinate arrangement according to prior art, longitudinal forces (thrust, inverters) are transmitted through the intermediate fastener. Transverse forces are distributed between this same intermediate fastener and the aft fastener, while forces along the vertical direction pass simultaneously through the forward fastener and the aft fastener.

Furthermore, the moment about the longitudinal axis is resisted by the forward fastener, and the moment about the transverse axis is resisted in the vertical direction by the assembly formed by the forward and aft fasteners. Finally, the moment about the vertical axis is resisted in the transverse direction by the assembly formed by the intermediate fastener and the aft fastener.

Although the solution that has just been presented provides a satisfactory means of transmitting static and dynamic forces generated by the engine under all flight conditions, it does have non-negligible disadvantages.

The intermediate fastener is necessarily large and relatively heavy, because its main function is to resist thrust forces. Naturally, this inevitably leads to a significant increase in the global mass of the mounting structure.

Note also that the mounting plate fixed to the shear pin necessary so that the shear pin can be mounted under the aircraft wing, is a part that is complex in design and difficult to define. Obviously, this is due to the need to make this mounting plate cooperate with components of the wing structure, in other words mainly stringers and ribs.

OBJECT OF THE INVENTION

Therefore, the purpose of the invention is to propose an engine mounting structure under an aircraft wing, this structure at least partially correcting the disadvantages mentioned above related to structures according to prior art.

More precisely, the purpose of the invention is to present an engine mounting structure under an aircraft wing, particularly including means of mounting this rigid structure under the wing, in which the design of these means is significantly simpler than in earlier designs.

To achieve this, the object of the invention is an engine mounting structure under an aircraft wing, comprising a rigid structure and means of fastening this rigid structure under the wing, the mounting means comprising a forward fastener, an intermediate fastener and an aft fastener. According to the invention, the forward fastener has at least one triangular shackle on each side of a vertical plane passing through a longitudinal axis of the engine, placed in a vertical plane oriented along a longitudinal direction of the aircraft. Furthermore, the intermediate fastener comprises a connecting rod capable of transferring forces applied in a direction transverse to the aircraft, and the aft fastener comprises at least one shackle oriented along a vertical direction of the aircraft.

Advantageously, the design of the structure mounting means according to the invention is very much simpler than the design encountered in mounting structures according to prior art. This is mainly due to the fact that the intermediate fastener provided in the invention is less complex than the spigot type fastener previously required to transfer thrust forces along the longitudinal direction of the aircraft.

Effectively, in this statically determinate arrangement of this invention, the longitudinal forces are transmitted by the two half-fasteners of the front fastener each comprising at least one triangular shackle, the transverse forces are transmitted through the intermediate fastener composed essentially of a single connecting rod, and forces along the vertical direction pass simultaneously through the forward fastener and the aft fastener.

Thus, elimination of this spigot fastener inevitably causes a considerable reduction in the mass and size of the mounting means, and consequently a non-negligible reduction in the global mass and cost of the mounting structure. Furthermore, the fact that the intermediate fastener is capable of transferring forces applied in the transverse direction means that the aft fastener can then have an extremely simple design, namely it can be made so that it simply resists the forces along the vertical direction.

Preferably, the intermediate fastener also comprises a lower fitting fixed to the rigid structure and an upper fitting fixed to the aircraft wing, and the connecting rod is mounted on the two lower and upper fittings, for example articulated.

Furthermore, this connecting rod may be arranged in a vertical plane oriented along the transverse direction of the aircraft, so as to resist forces applied in the same transverse direction as well as possible. In this respect, the connecting rod may also be arranged along this transverse direction of the aircraft.

Preferably, the aft fastener comprises a pair of shackles oriented along the vertical direction of the aircraft, and the forward fastener comprises a pair of triangular shackles on each side of the vertical plane passing through the longitudinal axis of the engine, placed in vertical planes oriented along the longitudinal direction of the aircraft. Obviously, the fact of providing pairs of shackles provides a means of obtaining better mechanical strength characteristics than are possible with solutions using single shackles.

It is then possible that the pair of shackles on the aft fastener can be connected to the rigid structure and to the aircraft wing through axes oriented along the longitudinal direction of this aircraft. Similarly, it is also possible that each of the two pairs of triangular shackles of the forward fastener is connected to the rigid structure and to the aircraft wing through axes oriented along the transverse direction of this aircraft.

Preferably, the aft fastener also comprises a fitting fixed to the rigid structure connected to the pair of shackles through an axis oriented along the longitudinal direction of this aircraft, and the aft fastener also comprises a fitting fixed to the wing, connected to the pair of shackles through an axis oriented along this same longitudinal direction.

Similarly, the forward fastener preferably comprises two fittings fixed to the rigid structure, each fitting being connected to one of the two pairs of triangular shackles through at least one axis oriented along the transverse direction of this aircraft, and the forward fastener also comprises two fittings fixed to the wing, each fitting being connected to one of the two pairs of triangular shackles through at least one axis oriented along the transverse direction of this aircraft.

Furthermore, for the forward fastener, each triangular shackle may be connected to the rigid structure and to the aircraft wing through three axes passing through it, preferably perpendicular, close to each of these three vertices.

According to a first preferred embodiment of this invention, at least one triangular shackle of the first fastener is connected to the rigid structure at one of its bases, and to the wing by the vertex opposite this base. In other words, at least one triangular shackle is arranged such that it extends vertically upwards from one of its bases to the vertex opposite this base.

According to a second preferred embodiment of this invention, at least one triangular shackle of the first fastener is connected to the rigid structure at one of its vertices, and to the wing by the base opposite this vertex. Once again, this means that at least one triangular shackle is arranged such that it extends vertically downwards, from one of its bases to the vertex opposite this base.

Other advantages and special features of the invention will become clearer in the non-limitative detailed description given below.

BRIEF DESCRIPTION OF THE FIGURES

This description will be made with reference to the appended figures, wherein.

DETAILED DESCRIPTION OF PREFERRED EMBODIMENTS

Figure 1:
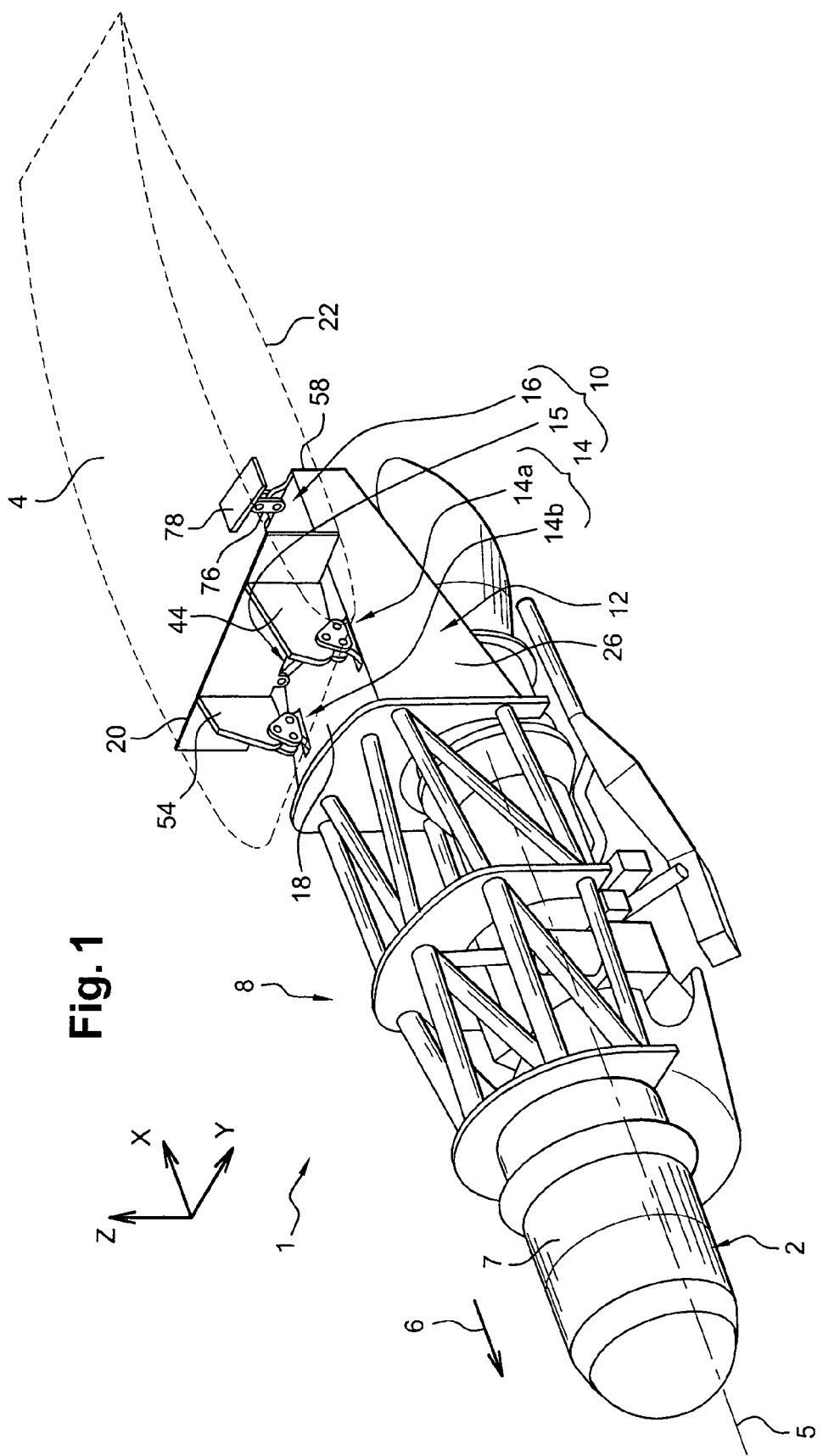
FIG. 1 shows a perspective view of an engine mounting structure under an aircraft wing, according to a first preferred embodiment of this invention.

FIG. 1 shows a mounting structure 1 according to a first preferred embodiment of this invention, this structure 1 being designed to suspend a turboprop 2 under an aircraft wing shown only diagrammatically for obvious reasons of clarity, and generally denoted by the numeric reference 4. Note that the mounting structure 1 shown in this FIG. 1 is adapted to cooperate with a turboprop 2, but it could be any structure designed to suspend any other type of engine such as a turbojet, without departing from the scope of the invention.

Throughout the following description, by convention, X is the direction parallel to a longitudinal axis 5 of the engine 2, Y is the transverse direction relative to the aircraft, and Z is the vertical direction, these three directions being orthogonal to each other. Thus, it should be understood that the directions X, Y and Z are the longitudinal, transverse and elevation directions both for the aircraft and for the engine 2.

Note that the longitudinal axis 5 of the engine 2 should be understood as being the longitudinal axis of the engine casing, and not the longitudinal axis of its propeller 7.

Secondly, the terms "forward" and "aft" should be considered with respect to a direction of progress of the aircraft as a result of the thrust applied by the engines 2, this direction being shown diagrammatically by the arrow 6.

Only one rigid structure 8 of the mounting structure 1 is shown in FIG. 1, accompanied by mounting means 10 for this rigid structure 8 under the wing 4 of the aircraft, these means 10 actually forming part of the mounting structure 1. Other components of this structure 1 that are not shown, of the secondary structure type, segregate and hold the systems while supporting aerodynamic fairings, and are conventional elements identical or similar to those encountered in prior art and known to those skilled in the art. Consequently, no detailed description of them will be made.

Similarly, the rigid structure 8 is similar to structures encountered in structures according to prior art and their design is specific and different depending on the nature of the engine that they are to suspend, and consequently will not be described further.

On the other hand, the mounting means 10, located generally towards the aft of the rigid structure 8, and more precisely at an underwing box 12 in the case shown of a rigid turboprop structure, are specific to this invention and therefore will be described in detail below.

In general, the mounting means 10 are composed of a front fastener 14, an intermediate fastener 15 and an aft fastener 16, the intermediate fastener 15 being located between the forward fastener 14 and the aft fastener 16. As will be described in detail below, the forward fastener 14 connects an upper stringer 18 of the underwing box 12 of the rigid structure 8, to a forward vertical stringer 20 forming an integral part of the wing structure 4 and extending approximately in a longitudinal direction (not shown) of this same wing 4. The intermediate fastener 15 also connects the upper stringer 18 of the underwing box 12 to the forward longitudinal stringer 20 of the wing 4.

Furthermore, the aft fastener 16 connects an aft end of the upper stringer 18 of the underwing box 12, to a horizontal rib (not shown) approximately perpendicular to a main wing stringer (not shown) forming an integral part of the structure of wing 4.

As can be seen in FIG. 1, the forward fastener 14 is actually composed of two half-fasteners 14a and 14b, approximately identical, arranged on each side of a vertical plane (not shown) passing through the longitudinal axis 5 of the engine and preferably arranged symmetrically about this plane. This is why only one of these two half-fasteners 14a, 14b will be described in detail below.

Figure 2:
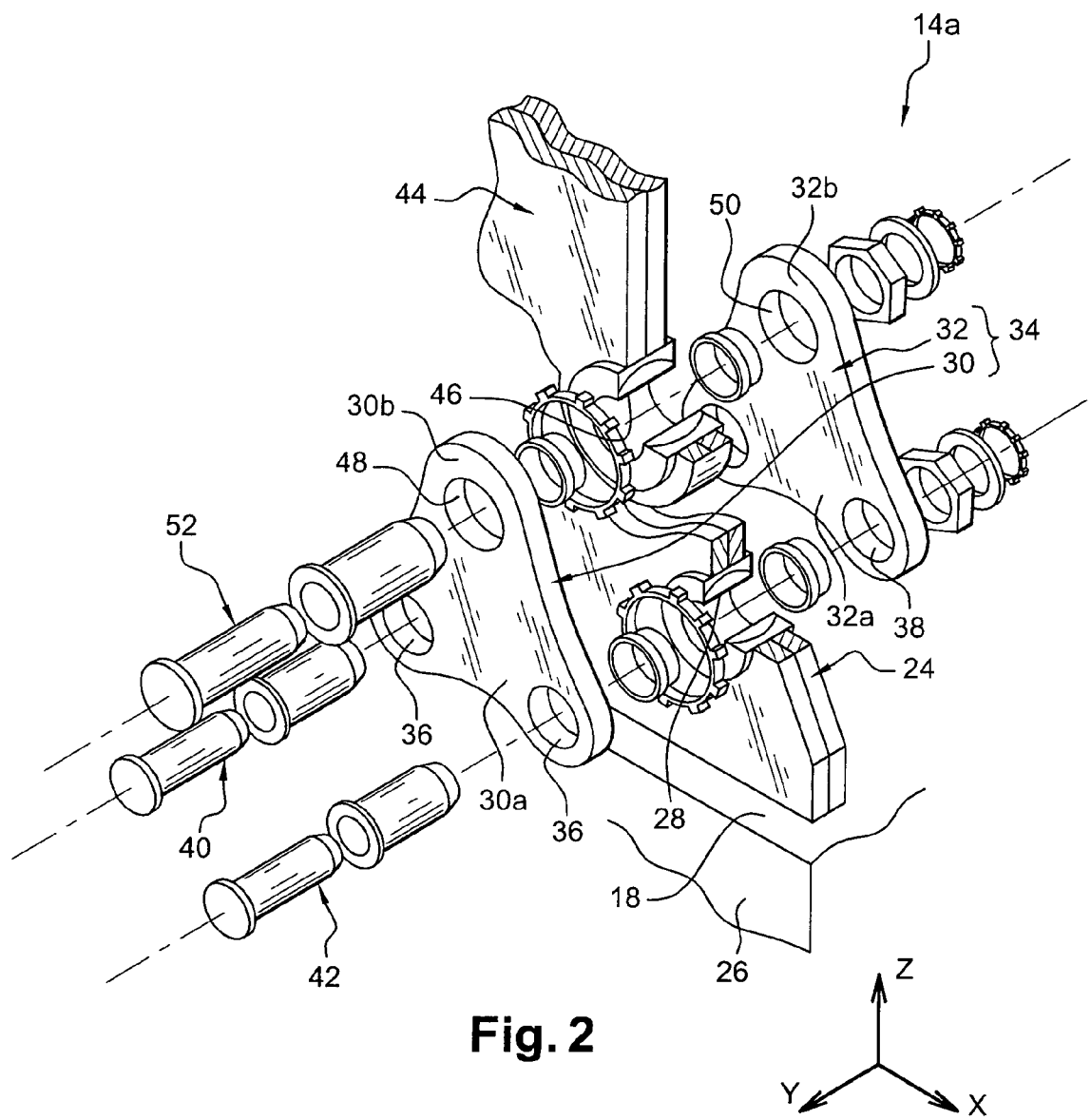
FIG. 2 shows an enlarged and exploded perspective view of part of the forward fastener of the mounting structure in FIG. 1.

With reference more specifically to FIG. 2, it can be seen that the half fastener 14a comprises firstly a fitting 24, preferably a double fitting, fixed to the stringer 18 of the underwing box 12. This fitting 24 extends in a vertical plane oriented along the longitudinal direction X, namely in an XZ plane, practically along the prolongation of a side plate 26 of the underwing box 12. It is also perforated by two through holes 28 (only one is shown in FIG. 2), oriented along the transverse Y direction of the aircraft.

Two triangular shackles 30 and 32, preferably identical and approximately in the form of an equilateral triangle, are arranged on each side of this fitting 24, also in XZ planes. Thus, the outer shackle 30 and the inner shackle 32 together form a pair of triangular shackles 34, in which the shackles 30, 32 are parallel to each other. Consequently, note that the pair of triangular shackles 34 could also be made using double shackles, without departing from the scope of the invention. In this case, the pair of shackles 34 would then comprise four identical shackles distributed in two sets of two superposed triangular shackles, arranged on each side of the fitting 24.

In this first preferred embodiment of the present invention, the outer shackle 30 is arranged such that one of its bases 30a is mounted on the fitting 24, this base 30a being oriented approximately along the longitudinal direction X. In this way, it is obvious that the shackle 30 is placed such that it extends vertically upwards along the Z direction from its base 30a, to a vertex 30b opposite this base 30a.

Thus, a through hole 36 oriented along the Y transverse direction is arranged close to each of the two vertices (not referenced) associated with this base 30a. Similarly, the inner shackle 32 is arranged in exactly the same way as the outer shackle 30, namely one of its bases 32a is mounted on the fitting 24, and this base 32a is arranged approximately along the longitudinal direction X. Consequently, once again, a through hole 38 is formed oriented along the transverse direction Y close to each of the two vertices (not referenced) associated with this base 32a.

In order to make the link between the pair of shackles 34 and the fitting 24, the half-fastener 14a then comprises two axes 40 and 42 oriented along the transverse direction Y, and arranged in the same horizontal XY plane. The forward axis 40, preferably double as shown in FIG. 2, passes in sequence through one of the two through holes 36 in the outer triangular shackle 30, one of the two through holes 28 formed in the fitting 24, and one of the two through holes 38 in the inner triangular shackle 32. Similarly, the aft axis 42, preferably also double, passes in sequence through the other of the two through holes 36 in the triangular outer shackle 30, the other of the two through holes 28 formed in the fitting 24, and the other of the two through holes 38 in the inner triangular shackle 32.

Furthermore, the half-fastener 14a is provided with another fitting 44 oriented in a vertical XZ plane and in the form of a rib of the structure of the wing 4, this rib 44 being fixed to the stringer 20 as is clearly visible in FIG. 1. A single through hole 46 is drilled in a lower forward part of this fitting 44 oriented vertically along the longitudinal direction X, oriented along the transverse Y direction of the aircraft.

To fasten the pair of triangular shackles 34 on this fitting 44, the outer shackle 30 is provided with a through hole 48 oriented along the Y transverse direction, this hole 48 being formed close to the vertex 30b opposite the base 30a mentioned above. Similarly, the inner shackle 32 is provided with a through hole 50 oriented along the Y transverse direction, this hole 50 being formed close to a vertex 32b opposite the base 32a indicated above.

With such an arrangement, an upper axis 52 oriented along the Y transverse direction, arranged above the axes 40 and 42 and preferably double like that shown in FIG. 2, can then form the link between the pair of shackles 34 and the fitting 44, by passing successively through the through hole 48 in the outer triangular shackle 30, the through hole 46 in the fitting 44, and the through hole 50 in the inner triangular shackle 32.

As mentioned above, the half-fastener 14b will not be described further, since the only difference between the fitting 54 inserted between the stringer 20 and the pair of triangular shackles (not referenced) and the fitting 44 of half-fastener 14a, is in their length along the X direction. Obviously, this is due to the position of the stringer 20 of the wing 4, which is located in a vertical plane inclined from a YZ plane.

Figure 3:
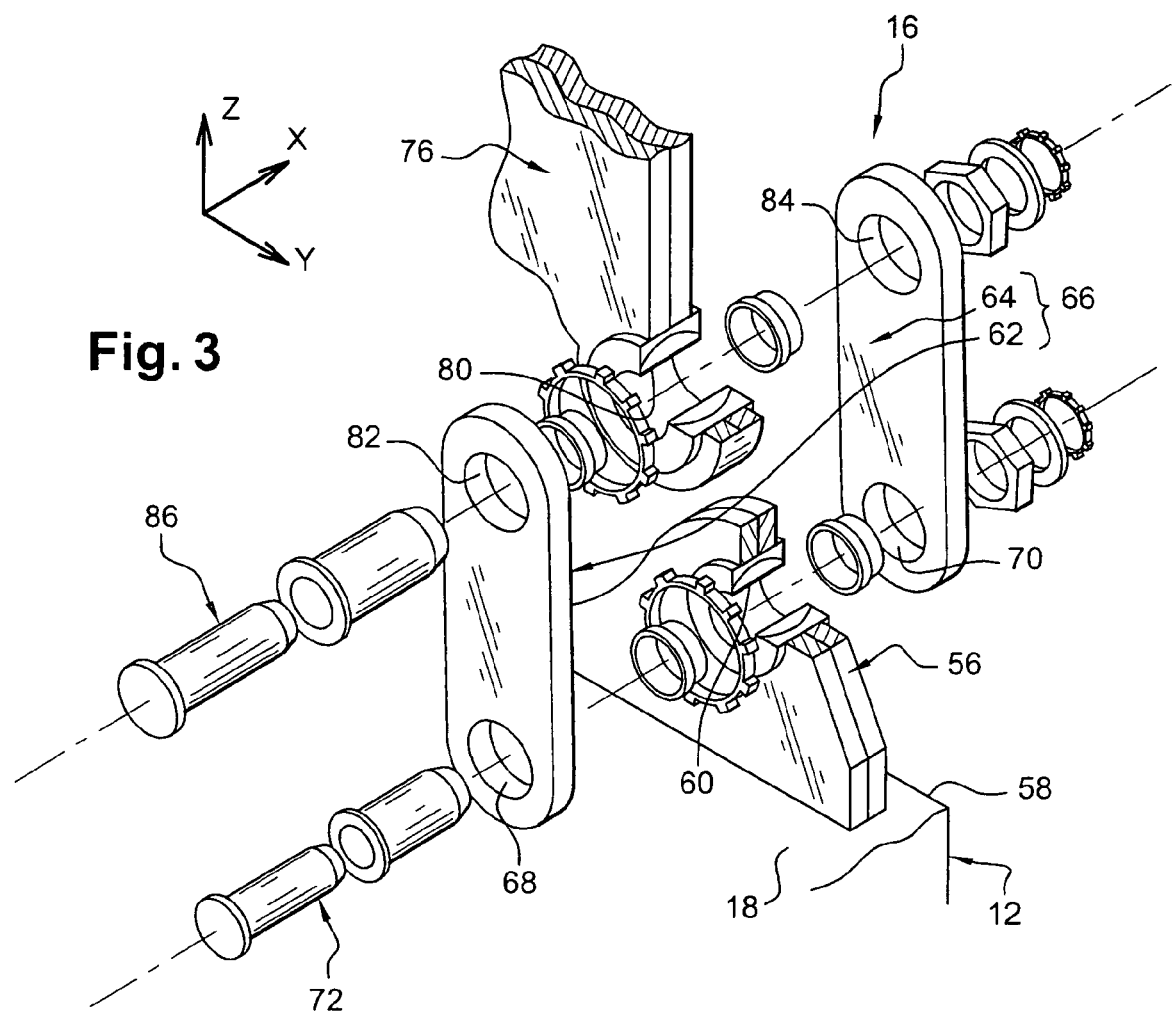
FIG. 3 shows an enlarged and exploded perspective view of the aft fastener of the mounting structure in FIG. 1.

With reference to FIG. 3, it can be seen that the aft fastener 16 comprises a fitting 56 fixed to an aft end of the stringer 18 of the underwing box 12. This fitting 56 extends in a vertical plane oriented along the Y transverse direction, namely in a YZ plane, practically in line with an aft vertical partition 58 of the underwing box 12. Furthermore, the fitting 56 is symmetric with respect to the vertical plane passing through the longitudinal axis of the engine 2.

This fitting 56 is perforated by a through hole 60 cut diagrammatically through the vertical plane passing through the longitudinal axis 5 mentioned above, and oriented along the longitudinal direction X of the aircraft.

Two simple shackles 62 and 64, preferably identical and approximately in the shape of a rectangle with rounded widths, are arranged on each side of this fitting 56, also in YZ planes. Thus, the forward shackle 63 and the aft shackle 64 together form a pair of shackles 66, in which the shackles 62, 64 are parallel to each other. Note that the pair of shackles 66 can also be made using double shackles without departing from the scope of the invention.

A through hole 68 is made close to a lower end (not referenced) of the forward shackle 62, oriented along the longitudinal direction X. Similarly, the aft shackle 64 is arranged identically to the forward shackle 62, namely along the vertical direction Z. Once again, a through hole 70 is formed oriented along the longitudinal direction X close to the lower end (not shown) of the aft shackle 64.

The aft fastener 16 is provided with a lower axis 72 oriented along the X longitudinal direction, to make the link between the pair of shackles 66 and the fitting 56. This lower axis 72, preferably double as shown in FIG. 3, then passes firstly through the through hole 68 in the forward shackle 62, the through hole 60 formed in the fitting 56, and the through hole 70 in the aft shackle 64.

Moreover, the aft fastener 16 is provided with another fitting 76 oriented globally in a YZ vertical plane and being prolonged upwards by a horizontal plate 78, this plate 78 being fixed to the horizontal rib approximately perpendicular to the main stringer of the wing 4. Consequently, the fitting 76 passes through an intrados skin 22 of the flange 4, or is added onto this skin 22 in liaison with the horizontal rib.

In a lower part, this fitting 76 is perforated by a single through hole 80, oriented along the longitudinal X direction of the aircraft.

To fasten the pair of shackles 66 on this fitting 76, the forward shackle 62 is provided with a through hole 82 oriented along the longitudinal X direction, this hole 82 being formed close to an upper end (not referenced) of this forward shackle 62. Similarly, the aft shackle 64 is provided with a through hole 84 oriented along the longitudinal direction X, this hole 84 being formed close to an upper end (not referenced) of this aft shackle 64.

With this arrangement, an upper axis 86 arranged above the axis 72 and preferably double as shown in FIG. 3, can then provide the link between the pair of shackles 66 and the fitting 76, passing in sequence through the through hole 82 of the forward shackle 62, the through hole 80 of the fitting 76, and the through hole 84 of the aft shackle 64.

Figure 4:
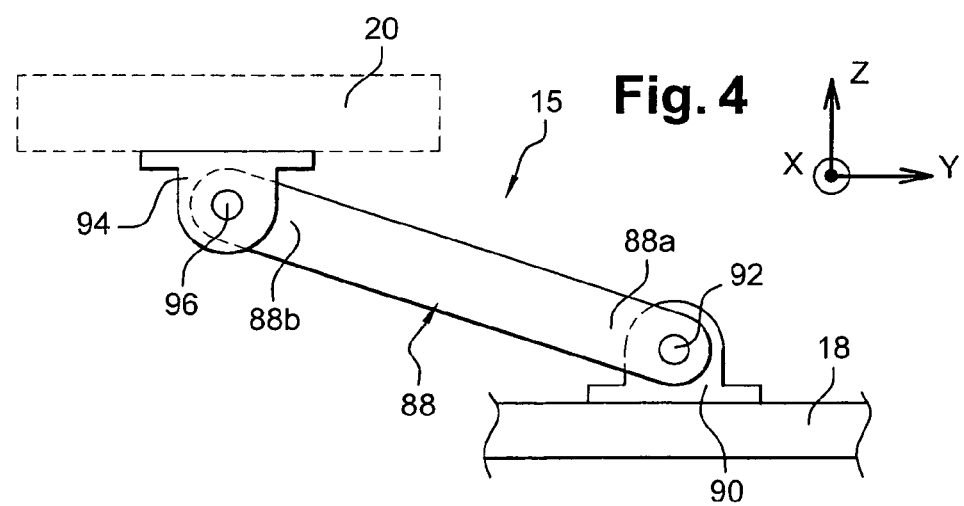
FIG. 4 shows an enlarged perspective view of the intermediate fastener of the mounting structure in FIG. 1.

With reference now to FIG. 4, it can be seen that the intermediate fastener 15 comprises mainly a connecting rod 88 for resistance of forces applied along the transverse direction Y, this connecting rod 88 being located in a vertical plane YZ, and preferably arranged along this same transverse direction Y or even slightly inclined from this Y direction, as is shown in FIG. 4.

The intermediate fastener 15 is also provided with an inner fitting 90 fixed to the stringer 18 of the underwing box 12, the fitting 90 being preferably doubled headed, and therefore perforated by two through holes (not referenced) in line along the longitudinal direction X. A first end 88a of the connecting rod 88 is thus mounted articulated on this fitting 90, through an axis 92 oriented along the longitudinal X direction.

Furthermore, the intermediate fastener 15 is provided with an upper fitting 94 fixed to the stringer 20 of the structure of wing 4, the fitting 94 also preferably being doubled headed, and therefore perforated by two through holes (not referenced) in line along the longitudinal X direction. A second end 88b of the connecting rod 88 is then mounted articulated on this fitting 94, through an axis 96 oriented along the longitudinal X direction.

Finally, it is possible that the vertical plane passing through the longitudinal axis 5 of the turboprop 2 should pass approximately through the middle of the connecting rod 88.

In this statically determinate arrangement of the present invention, longitudinal forces (thrust, inverters) are transmitted through the forward fastener 14. Transverse forces are transmitted through the intermediate fastener 15, while forces along the vertical direction pass simultaneously through the forward fastener 14 and the aft fastener 16. Note that with this configuration, the longitudinal forces pass directly through ribs 44 and 54 of the structure of the wing 4, these ribs 44 and 54 being globally located in the aft direction from the half fasteners 14a, 14b.

Furthermore, the moment about the longitudinal axis is resisted in the vertical direction by the two half-fasteners 14a, 14b of the forward fastener 14, and the moment about the transverse axis is also resisted in the vertical direction by the assembly formed by the forward fastener 14 and the aft fastener 16. Finally, the moment about the vertical axis is resisted in the longitudinal direction by the two half-fasteners 14a, 14b of the forward fastener 14.

Figure 5:
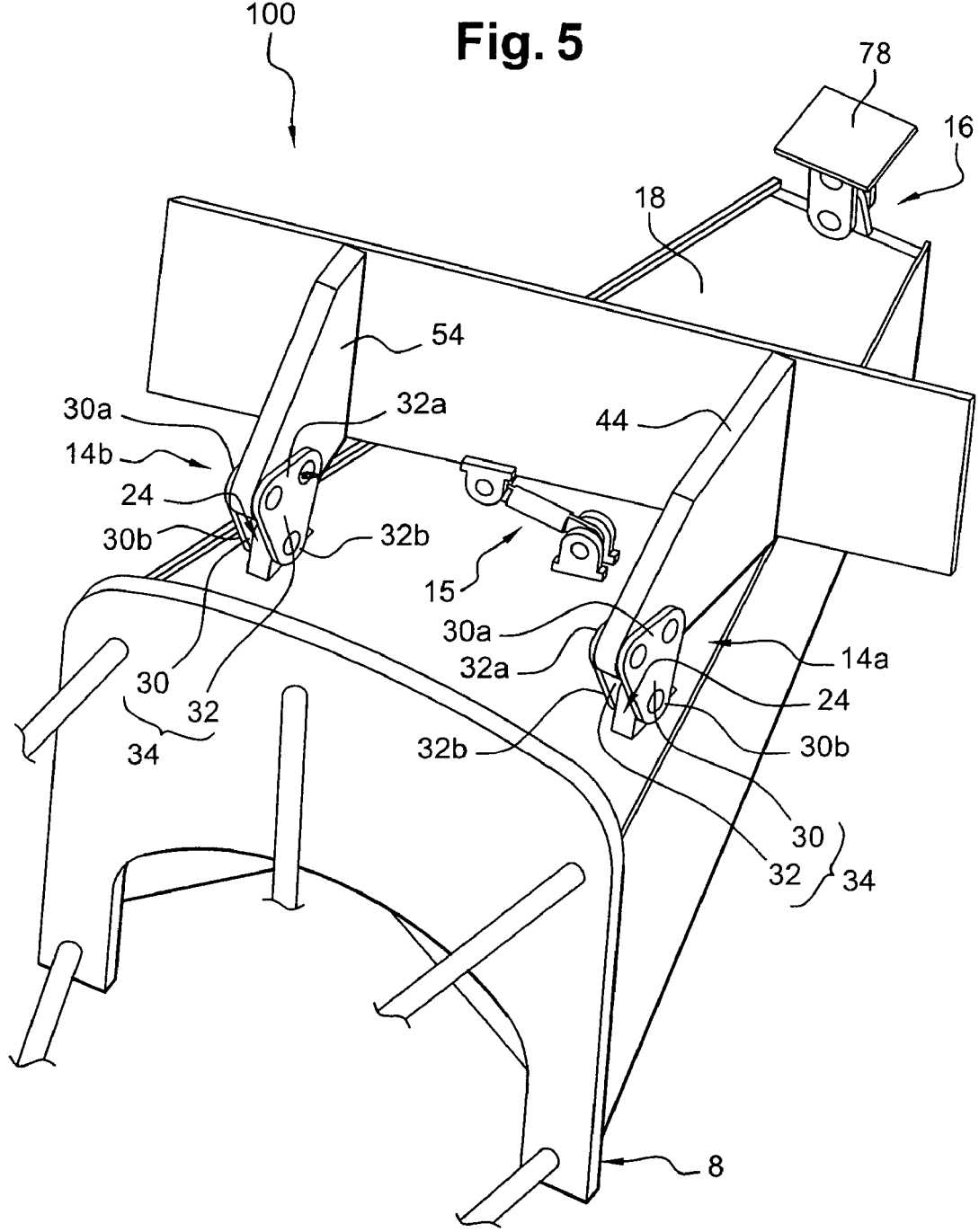
FIG. 5 shows a partial perspective view of an engine mounting structure under an aircraft wing according to a second preferred embodiment of this invention.

FIG. 5 shows part of a mounting structure 100 according to a second preferred embodiment of this invention. This structure 100 is approximately identical to the structure 1 according to the first embodiment described above. Consequently, elements with the same numeric references correspond to identical or similar elements.

Thus, this FIG. 5 shows that the difference between the mounting structures 1 and 100 is in the arrangement of triangular shackles belonging to the forward fastener 14 of the mounting means 10.

If all the triangular shackles 30 and 32 of the structure 1 were arranged such that they extend vertically upwards, from one of their bases to the vertex opposite this base, these same triangular shackles of the structure 100 would also extend vertically, but from one of their bases to the vertex opposite this base in the downwards direction. In other words, the triangular shackles 30, 32 of the pair of shackles 44 were pivoted by 180° about the transverse Y direction from their positions occupied in the first preferred embodiment.

Consequently, and as can be clearly seen in FIG. 5, the bases 30a and 32a of the two half-fasteners 14a, 14b of the forward fastener 14 are connected to fittings 44 and 54 of wing 4, and the opposite vertices 30b and 32b are connected to fittings 24 fixed to the rigid structure 8.

Obviously, those skilled in the art could make various modifications to the mounting structures 1 and 100 that have been described above as non-limitative examples only.

The invention claimed is:

1. Mounting structure for mounting an engine under an aircraft wing, said structure comprising:
   a rigid structure; and
   a statically determinant fastener arrangement including
      a forward fastener between said rigid structure and said aircraft wing;
      an intermediate fastener between said rigid structure and said aircraft wing; and
      an aft fastener between said rigid structure and said aircraft wing,
      wherein said forward fastener includes at least one triangular shackle located on each side of a vertical plane substantially parallel to a longitudinal axis of the engine, placed in a vertical plane oriented along a longitudinal direction X of the aircraft,
      wherein said forward fastener is configured to transfer all forces between said rigid structure and the wing that are applied in said longitudinal direction X,
      wherein said intermediate fastener comprises a connecting rod configured to transfer all forces between said rigid structure and said wing that are applied in a direction Y transverse to the aircraft,
      wherein said aft fastener comprises at least one shackle oriented substantially parallel to a vertical direction Z of the aircraft, and
      wherein the longitudinal axis of said connecting rod is arranged substantially parallel to the transverse direction Y of the aircraft.

2. Mounting structure according to claim 1 for mounting an engine,
   wherein said intermediate fastener includes a lower fitting fixed to the rigid structure and an upper fitting fixed to the wing of the aircraft, and
   wherein a first end of said connecting rod is mounted on the lower fitting and a second end of said connecting rod is mounted on the upper fitting.

3. Mounting structure according to claim 2 for mounting an engine, wherein said first end of said connecting rod is articulately mounted on the lower fitting and said second end is articulately mounted on the upper fitting.

4. Mounting structure according to claim 1 for mounting an engine, wherein said connecting rod is located in a vertical plane oriented substantially parallel to the transverse direction Y of the aircraft.

5. Mounting structure according to claim 1 for mounting an engine,
wherein said aft fastener comprises a pair of shackles oriented substantially parallel to the vertical direction Z of the aircraft,
wherein the forward fastener comprises two pairs of triangular shackles,
wherein each pair of triangular shackles is located on each side of the vertical plane passing through the longitudinal axis of the engine, and
wherein the two pairs of triangular shackles are located in vertical planes oriented substantially parallel to the longitudinal direction X of the aircraft.

6. Mounting structure according to claim 5 for mounting an engine, wherein said pair of shackles of the aft fastener is connected to the rigid structure and to the wing of the aircraft, by at least one fastening mechanism oriented substantially parallel to the longitudinal direction X of said aircraft.

7. Mounting structure according to claim 5 for mounting an engine, wherein each of the two pairs of triangular shackles of the forward fastener is connected to the rigid structure and to the wing of the aircraft by at least one fastening mechanism oriented substantially parallel to the transverse direction Y of said aircraft.

8. Mounting structure according to claim 5 for mounting an engine,
wherein said aft fastener also comprises a fitting fixed to the rigid structure and connected to said pair of shackles by at least one fastening mechanism oriented substantially parallel to the longitudinal direction X of said aircraft, and
wherein said aft fastener also comprises a fitting fixed to the wing and connected to said pair of shackles by at least one fastening mechanism oriented substantially parallel to the longitudinal direction X of said aircraft.

9. Mounting structure according to claim 5 for mounting an engine,
wherein said forward fastener also comprises two fittings fixed to the rigid structure, each fitting being connected to one of the two pairs of triangular shackles by at least one fastening mechanism oriented substantially parallel to the transverse direction Y of said aircraft, and
wherein said forward fastener also comprises two fittings fixed to the wing, each fitting being connected to one of the two pairs of triangular shackles by at least one fastening mechanism oriented substantially parallel to the transverse direction Y of said aircraft.

10. Mounting structure according to claim 1 for mounting an engine, wherein each triangular shackle of the forward fastener is connected to the rigid structure and to the aircraft wing by at least three fastening mechanisms that pass through each triangular shackle substantially at each of three vertices of each triangular shackle.

11. Mounting structure according to claim 1 for mounting an engine, wherein at least one triangular shackle of the forward fastener is connected to the rigid structure at a base of the at least one triangular shackle, and the at least one triangular shackle to the wing by a vertex of the at least on triangular shackle opposite said base.

12. Mounting structure according to claim 1 for mounting an engine, wherein at least one triangular shackle of the forward fastener is connected to the rigid structure at a vertex of the at least one triangular shackle, and the at least one triangular shackle is connected to the wing at a base of the at least one triangular shackle opposite said vertex.

13. Mounting structure according to claim 1 for mounting an engine,
wherein said forward fastener further comprises at least one first fitting fixed to the aircraft wing, at least one second fitting fixed to the rigid structure and at least two triangular shackles;
wherein said at least two triangular shackles are removably mounted to the first fitting and the second fitting such that the at least two triangular shackles are removably mounted substantially parallel to each other on either side of the first fitting and the second fitting and extend substantially parallel to a longitudinal axis of the engine, and extend substantially parallel to a vertical plane oriented along a longitudinal direction X of the aircraft.

14. Mounting structure according to claim 1 for mounting an engine, wherein said at least one triangular shackle includes at least three through-holes that are not arranged in a line.

15. Mounting structure according to claim 14 for mounting an engine, wherein said at least three through holes are arranged as vertices of an equilateral triangle.

16. Mounting structure according to claim 1 for mounting an engine, wherein the at least one triangular shackle is not integral with either the aircraft wing or the rigid structure.

17. Mounting structure according to claim 1 for mounting an engine, wherein the mounting structure does not include a spigot fastener,
wherein said spigot fastener includes a ball joint fixed in the rigid structure, and a shear pin fixed under the aircraft wing, so that the shear pin projects into the ball joint.

18. Mounting structure according to claim 2 for mounting an engine, wherein said lower fitting is double headed and perforated by two through holes and includes a base that is directly mounted to a stringer of the rigid structure.

19. Mounting structure according to claim 18 for mounting an engine, wherein said base of said lower fitting extends in a horizontal plane oriented substantially parallel to the transverse direction Y and the longitudinal direction X of the aircraft.

20. Mounting structure according to claim 2 for mounting an engine, wherein said upper fitting is double headed and perforated by two through holes and includes a base that is directly mounted to a stringer of the wing of the aircraft.

21. Mounting structure according to claim 20 for mounting an engine, wherein said base of said upper fitting extends in a horizontal plane oriented substantially parallel to the transverse direction Y and the longitudinal direction X of the aircraft.

22. Mounting structure according to claim 2 for mounting an engine,
wherein said lower fitting includes a base that is directly mounted to a stringer of the rigid structure,
wherein said upper fitting includes a base that is directly mounted to a stringer of the wing of the aircraft, and
wherein said base of said lower fitting is substantially parallel to said base of said upper fitting.

23. Mounting structure according to claim 1 for mounting an engine, wherein the combination of said forward fastener and said aft fastener is configured to transfer all forces applied in the vertical direction (Z) of the aircraft.

24. Mounting structure according to claim 1 for mounting an engine, wherein a combination of said forward fastener, said intermediate fastener, and said aft fastener is configured to transfer all forces applied in the longitudinal direction (X), the transverse direction (Y), and a vertical direction (Z) of the aircraft.

25. Mounting structure according to claim 24 for mounting an engine, wherein all moments about an axis substantially parallel to the longitudinal direction (X) is resisted in the vertical direction (Z) by said forward fastener, all moments about an axis substantially parallel to the transverse direction (Y) is resisted in the vertical direction (Z) by a combination of said forward fastener and said aft fastener, and all moments about an axis substantially parallel to the vertical direction (Z) is resisted in the longitudinal direction (X) by said forward fastener.

26. Mounting structure according to claim 1 for mounting an engine, wherein said rigid structure is interposed between the engine and said statically determinant fastener arrangement.

* * * * *